(12) United States Patent
Remillard

(10) Patent No.: US 11,343,968 B2
(45) Date of Patent: May 31, 2022

(54) CROP HARVESTING REEL WITH AN END SHIELD PLATE AND FINGERS FOR GUIDING CROP

(71) Applicant: MacDon Industries Ltd., Winnipeg (CA)

(72) Inventor: Rheal Remillard, St. Joseph (CA)

(73) Assignee: MacDon Industries LTD, Winnipeg (CA)

( * ) Notice: Subject to any disclaimer, the term of this patent is extended or adjusted under 35 U.S.C. 154(b) by 484 days.

(21) Appl. No.: 16/212,209

(22) Filed: Dec. 6, 2018

(65) Prior Publication Data

US 2020/0178466 A1    Jun. 11, 2020

(51) Int. Cl.
| | |
|---|---|
| *A01D 57/12* | (2006.01) |
| *A01D 57/03* | (2006.01) |
| *A01D 43/06* | (2006.01) |
| *A01D 41/14* | (2006.01) |
| *A01D 34/04* | (2006.01) |

(52) U.S. Cl.
CPC ............. *A01D 57/12* (2013.01); *A01D 41/14* (2013.01); *A01D 43/06* (2013.01); *A01D 57/03* (2013.01); *A01D 34/04* (2013.01)

(58) Field of Classification Search
CPC ........ A01D 57/12; A01D 57/02; A01D 57/03; A01D 57/025; A01D 41/14; A01D 43/06; A01D 43/061
See application file for complete search history.

(56) References Cited

U.S. PATENT DOCUMENTS

| | | | | |
|---|---|---|---|---|
| 3,360,912 A | * | 1/1968 | Erdman ................. | A01D 57/02 56/220 |
| 4,329,837 A | * | 5/1982 | Vissers ............... | A01D 78/1064 56/370 |
| 4,693,065 A | * | 9/1987 | Aron ...................... | A01D 84/02 56/377 |
| 4,751,809 A | * | 6/1988 | Fox ........................ | A01D 57/02 56/220 |
| 4,936,082 A | * | 6/1990 | Majkrzak ............... | A01D 57/02 56/220 |
| 6,502,379 B1 | * | 1/2003 | Snider .................... | A01D 57/02 56/221 |
| 6,591,598 B2 | * | 7/2003 | Remillard .............. | A01D 57/03 56/221 |
| 6,698,175 B1 | * | 3/2004 | Schumacher .......... | A01D 57/03 56/220 |

(Continued)

*Primary Examiner* — Thomas B Will
*Assistant Examiner* — Madeline I Runco
(74) *Attorney, Agent, or Firm* — Miller Canfield

(57) ABSTRACT

A reel of a harvester including a cutter bar includes a plurality of reel bats which are pivotal so as to vary the angle of the fingers about the bat axis as the reel rotates and an end shield plate mounted on the reel at the end of the reel. The end plate has a peripheral edge located radially inward of an outer tip of the fingers with an apex at each of the bats and portions which are recessed from a straight line joining the apexes to allow rotation of the finger around the bat axis without contacting the peripheral edge. Each of the endmost fingers of the bats has a base which is axially inside the end plate and is bent longitudinally of the reel to define an outer tip which is axially spaced from the base to a position beyond the radial plane of the end plate.

19 Claims, 7 Drawing Sheets

(56) References Cited

U.S. PATENT DOCUMENTS

| | | | | |
|---|---|---|---|---|
| 6,708,475 B2* | 3/2004 | Guyer | ...................... | A01D 57/03 |
| | | | | 56/220 |
| 6,843,045 B2* | 1/2005 | Bickel | ...................... | A01D 57/03 |
| | | | | 56/14.4 |
| 7,131,253 B2* | 11/2006 | Remillard | ............... | A01D 57/02 |
| | | | | 56/14.4 |
| 7,146,790 B2* | 12/2006 | Duquesne | ............... | A01D 57/02 |
| | | | | 56/220 |
| 8,387,351 B2* | 3/2013 | Guyer | ...................... | A01D 57/03 |
| | | | | 56/226 |
| 8,590,284 B2* | 11/2013 | Rayfield | ................. | A01D 75/18 |
| | | | | 56/226 |
| 9,622,413 B2* | 4/2017 | Neely | ...................... | A01D 63/04 |
| 9,844,183 B2* | 12/2017 | Honey | ................. | A01D 57/025 |
| 9,936,641 B2* | 4/2018 | Remillard | ............... | A01D 57/02 |
| 2012/0304611 A1* | 12/2012 | Rayfield | ................. | A01D 75/18 |
| | | | | 56/226 |
| 2017/0059027 A1* | 3/2017 | Jasper | ...................... | F16H 53/06 |
| 2017/0311546 A1* | 11/2017 | Jost | ......................... | A01D 57/04 |
| 2018/0242525 A1* | 8/2018 | Schwinn | ............... | A01D 57/02 |

* cited by examiner

CROP HARVESTING REEL WITH AN END SHIELD PLATE AND FINGERS FOR GUIDING CROP

This invention relates to a crop harvesting heard including reel with an end plate and fingers for guiding crop over a cutter bar to crop collection.

BACKGROUND OF THE INVENTION

In U.S. Pat. No. 6,591,598 (Remillard) assigned to the present Applicants is disclosed a crop harvesting header including a cutter bar and a reel for controlling movement of the crop in the area over the cutter bar. The reel is rotatable about an axis generally parallel to the cutter bar and has a plurality of reel bats each having reel fingers projecting generally radially outwardly from the reel axis. The reel bats are pivotal each about a respective bat axis parallel to the reel axis so as to vary the angle of the fingers about the bat axis as the reel rotates. The reel co-operates with a cam carried on the reel arms in generally stationary position so that each bat has a crank arm with a cam follower on the crank arm which follows the cam as the reel rotates relative to the cam and causes the required pivotal movement of the bat.

The reel bats are carried in bearings mounted on reel support plates at spaced positions along the reel.

The number of bats can vary but in many arrangement there are six such bats arranged at angularly spaced positions around the reel axis. The above patent discloses the cam arrangement which is located at one end of the reel for controlling the movement of the bats around their individual bat axes and the finger pattern thus obtained. The cam can be adjusted to change the angular position of the finger pattern around the axis. The cam is arranged at one end of the reel and the cam is smaller than the bat circle to that bats can project past the cam to provide end fingers which are at least aligned with the cam.

At the end of the reel is typically provided an end shield plate just beyond the cam which acts to contact the crop to hold it on the bats of the reel and reduces tendency of the crop to exit over the end of the reel. The end plate also acts to reduce the tendency of the crop to wrap around the reel. The end plate is thus in effect the end most component of the reel at the adjacent reel support arm on which the support shaft of the reel is mounted. In arrangements used up to date, the end plate has an outer perimeter edge which is either circular so as to surround the outer periphery of the tine tubes, or is polygonal with apexes at the tine tubes (typically 5 or 6) and with straight portions joining the apexes.

Each tine tube carries endmost fingers which typically lie in a radial plane of the reel axis so that they are positioned inside the endplate and spaced axially from the radial plane containing the end plate.

SUMMARY OF THE INVENTION

According to a first aspect of the invention there is provided a crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar; the reel being mounted on the header frame structure for movement therewith in the direction of movement and for rotation about a reel axis generally parallel to the cutter bar;

the reel having a plurality of reel bats at spaced positions around the reel axis, the reel bats all lying on a common bat circle around the reel axis so that rotation of the reel causes the reel bats to follow a path of movement lying on the bat circle;

each of the reel bats being pivotal by a drive linkage about its respective bat axis parallel to the reel axis so as to vary the angle of the fingers about the bat axis as the reel rotates;

each reel bat having a row of bat fingers projecting generally outwardly from the bat axis with the bat fingers of the row being arranged at longitudinally spaced positions along the bat axis and including an end most finger adjacent an end of the reel;

an end shield plate mounted on the reel at the end of the reel for rotation with the bats around the reel axis and lying generally in a radial plane of the axis of the reel;

the end shield plate having a peripheral edge located radially inward of an outer tip of the bat fingers;

each of the endmost fingers of the bats having a base at the bat which is axially inside the end shield plate;

and each of the endmost fingers is shaped to define an outer tip which is axially spaced from the base to a position at least axially aligned with the radial plane of the end shield plate.

Preferably each of the endmost fingers is shaped to define an outer tip which is axially spaced from the base to a position beyond the radial plane of the end shield plate.

Thus the fingers at the end of the reel extend to a position at least aligned with the end shield plate which improves crop flow at this end and reduces the possibility of crop stalling or wrapping at this location. This can also reduce the possibility for crop material to collect between the end of the reel and the conventional header end panel.

In order for the tip to reach this location, preferably each of the endmost fingers is bent in a direction longitudinally of the axis that is out of the radial plane of the base of the finger at which it is connected to the tine tube or bat. The finger may also be bend from a line radial to the tine tube in conventional manner.

Typically the end fingers each can be formed from a metal rod or wire so that they can be readily bent to take up the required angles whereas other fingers of the bats other than the endmost fingers are formed of plastics material in conventional manner and lie in a radial plane of the bat axis. However the end fingers may be molded plastic shaped to provide the required bend so that all fingers may be plastic, all may be metal or there may be a mixture of both metal and plastic.

The end plate may or may not lie wholly in a radial plane of the reel axis. The end plate can be open at a center part which may be located only at the Preferably the peripheral edge of the end shield plate has an apex at each of the bats. In order to allow the required movement of the endmost fingers around the bat axis, the peripheral edge at each of the bats includes portions which are recessed from a straight line joining the apexes and this recessed portion acts to allow rotation of the endmost finger around the bat axis without contacting the peripheral edge.

Preferably the peripheral edge of the end shield plate has a portion adjacent the apex which is substantially part circular around the bat axis since this allows the free movement of the finger as it rotates around this axis.

In addition to the movement of the finger, a scalloped shape of the peripheral edge of the end shield plate provides discontinuities in the edge which help move the crop rearwardly as the reel rotates. These discontinuities can be formed by the recesses which are recessed by a sharper angle on the downstream side of the apex than on the upstream side of the apex relative to the direction of rotation of the reel.

In particular, preferably the peripheral edge is shaped so that a deepest recess of the peripheral edge is closer to an upstream apex than a downstream apex to form a scalloped shape.

That is preferably the peripheral edge of the end shield plate has a portion adjacent the apex which is substantially part circular around the bat axis and remains substantially circular up to a position close to a deepest recess of the peripheral edge.

Typically the drive linkage comprises a cam member mounted at one end of the reel, each bat having associated therewith a respective control link, such that, as the reel rotates through a series of angularly spaced positions of the bats, the movement of the control link defined by the cam member causes said pivotal movement of the respective bat about the bat axis. In this arrangement preferably the endmost finger has a base thereof which is located between the cam member and the end shield plate.

Preferably also there is provided an end sheet lying in a vertical plane at right angles to the cutter bar so as to lie along the direction of working movement where the end sheet is substantially immediately adjacent the end shield plate. The provision of the fingers which extend beyond the end shield plate assist in preventing collection of material between the end shield and the end sheet.

According to a second aspect of the invention there is provided a crop harvesting header comprising:

a header frame structure arranged for movement in a direction of working movement across ground carrying a crop to be harvested;

a cutter bar arranged across a forward edge of the header frame structure for cutting the crop;

a cut crop transport arrangement mounted on the header frame structure for receiving and transporting the cut crop for further processing;

and a reel for controlling movement of the crop in the area over the cutter bar; the reel being mounted on the header frame structure for movement therewith in the direction of movement and for rotation about a reel axis generally parallel to the cutter bar;

the reel having a plurality of reel bats at spaced positions around the reel axis, the reel bats all lying on a common bat circle around the reel axis so that rotation of the reel causes the reel bats to follow a path of movement lying on the bat circle;

each of the reel bats being pivotal by a drive linkage about its respective bat axis parallel to the reel axis so as to vary the angle of the fingers about the bat axis as the reel rotates;

each reel bat having a row of bat fingers projecting generally outwardly from the bat axis with the bat fingers of the row being arranged at longitudinally spaced positions along the bat axis;

an end shield plate mounted on the reel at the end of the reel for rotation with the bats around the reel axis and lying generally in a radial plane of the axis of the reel;

the end shield plate having a peripheral edge located radially inward of an outer tip of the bat fingers;

wherein the peripheral edge of the end shield plate has an apex at each of the bats and the peripheral edge at each of the bats includes portions which are recessed from a straight line joining the apexes.

BRIEF DESCRIPTION OF THE DRAWINGS

One embodiment of the invention will be described in conjunction with the accompanying drawings in which.

Figure 1:
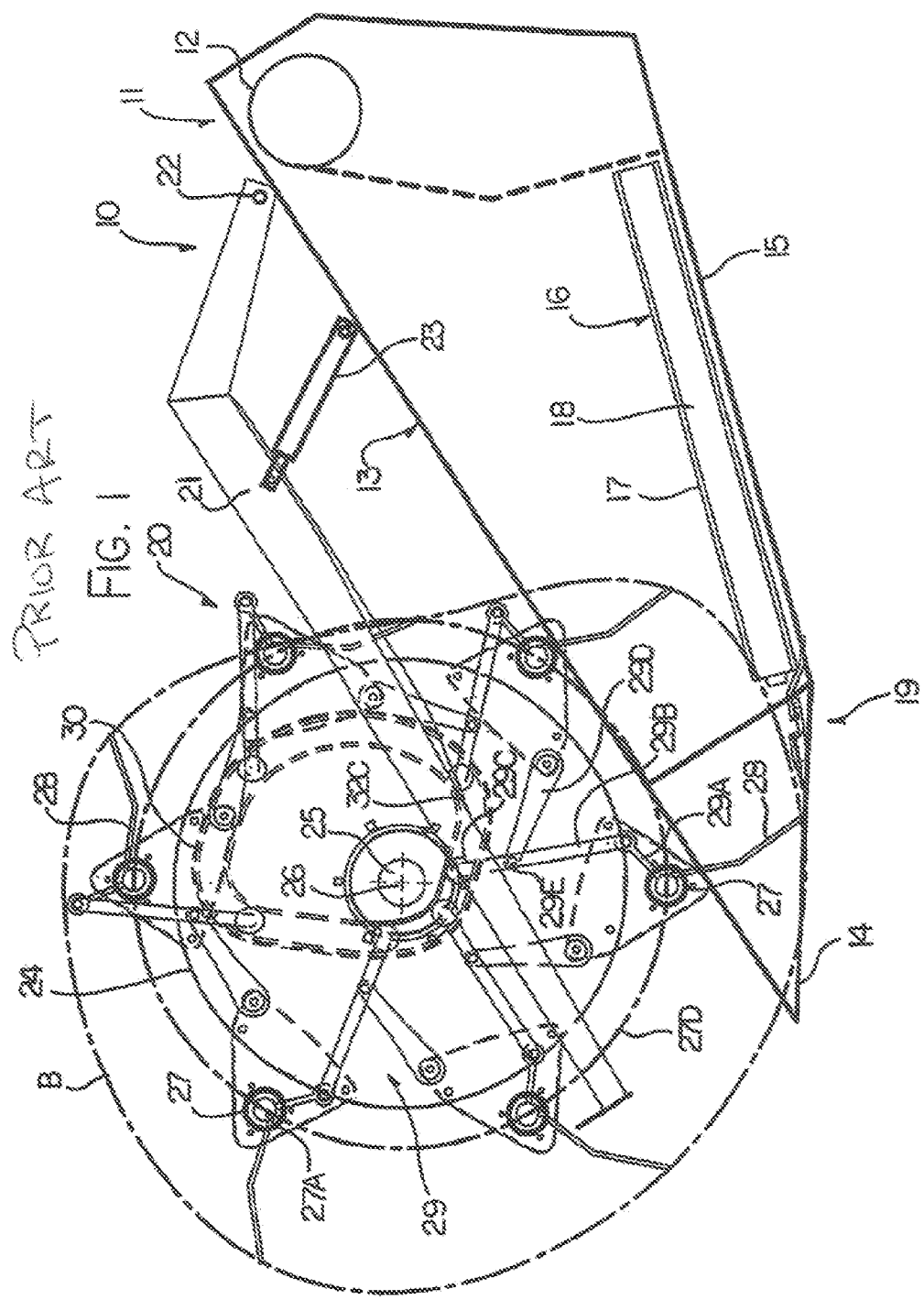
FIG. 1 is a schematic view of a header according to the present invention looking along the header toward one end and showing the reel, reel support arms, tine tubes, table, header frame, frame end sheet, cam and control linkages, with the end mounting disks of the reel omitted for convenience of illustration.

Figure is a transverse cross-sectional view of the reel only of FIG. 1.

Figure 2:
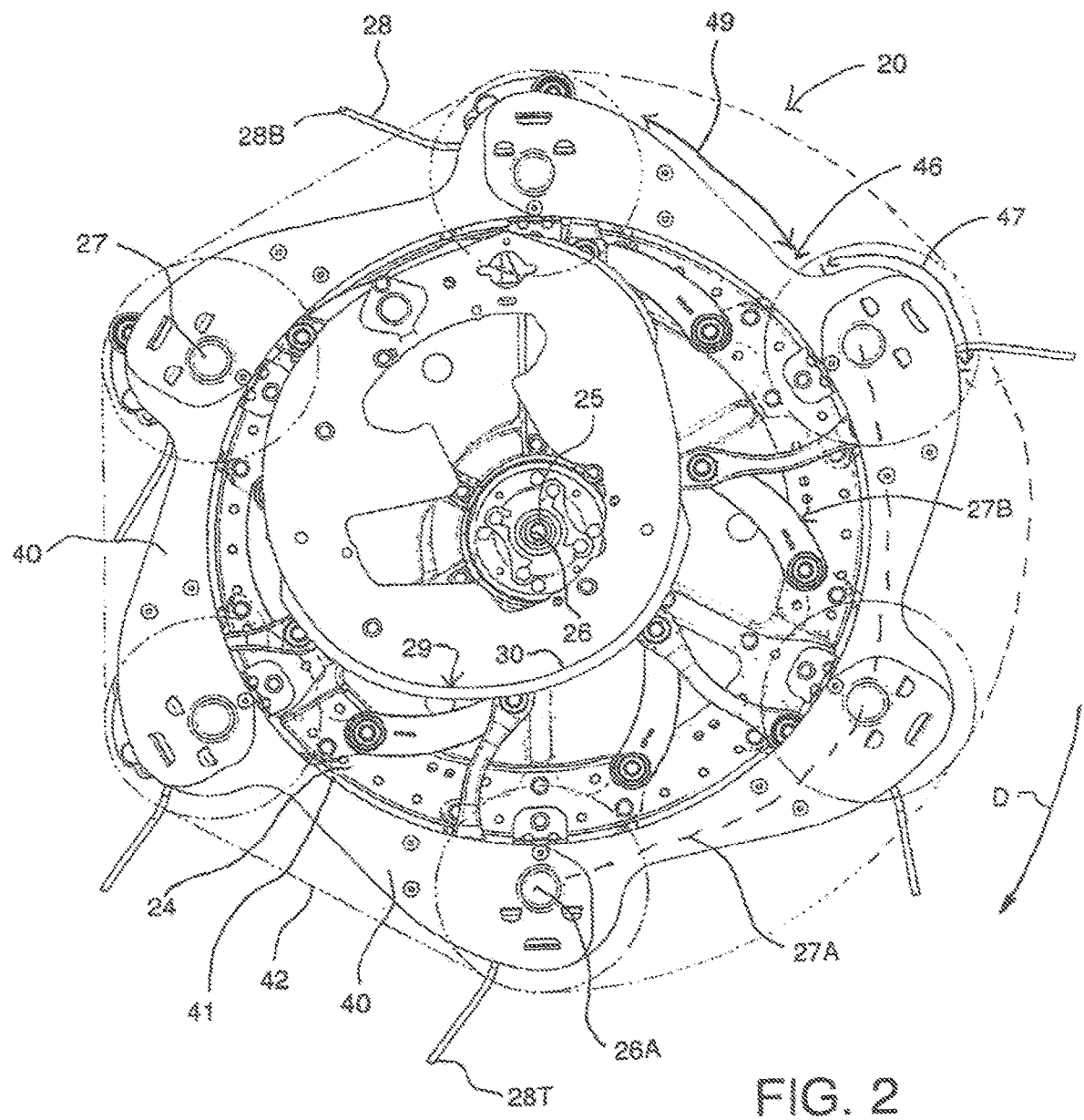
FIG. 2 is a transverse cross-sectional view of the reel only of FIG. 1.
Figure 5:
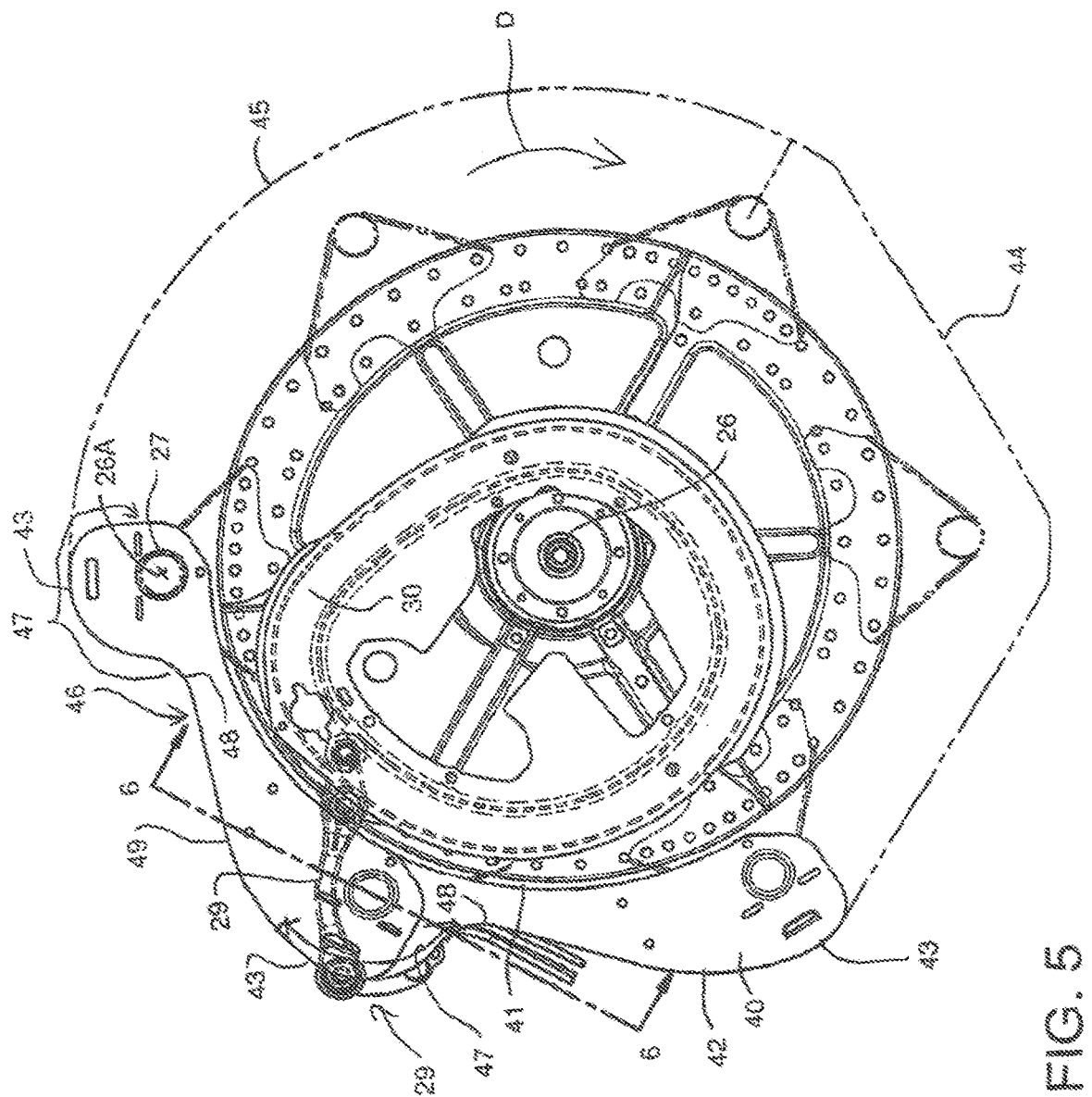

FIG. 5 is a transverse cross-sectional view similar to FIG. 2 which is simplified to show the shape of the end shield plate.

Figure 6:
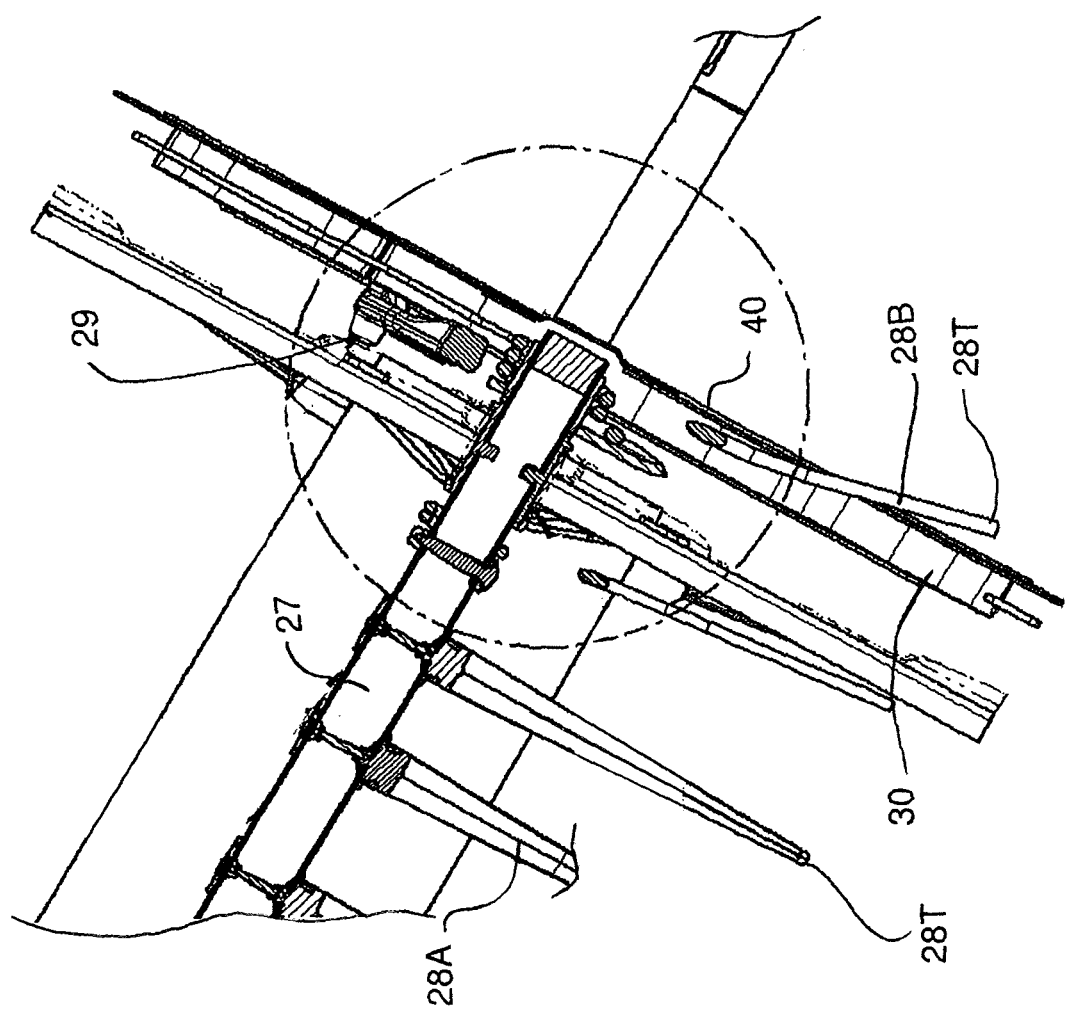

FIG. 6 is a longitudinal cross-sectional view of one tine tube which is simplified to show the shape of the endmost fingers.

Figure 7:
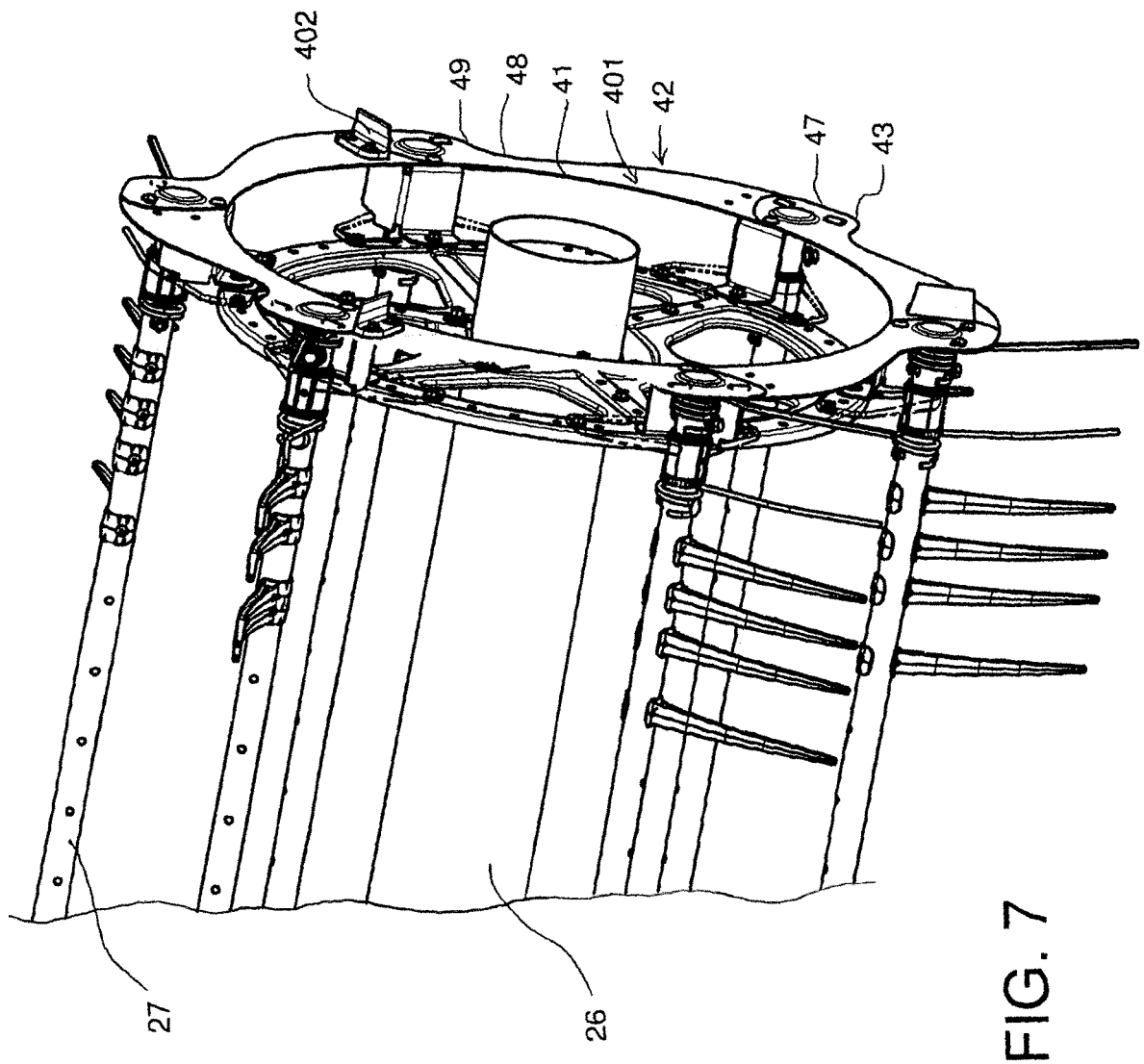

FIG. 7 is an isometric view of the reel only of FIG. 1 showing only the end opposite the finger control cam.

DETAILED DESCRIPTION

In FIG. 1 is shown an embodiment of a header according to the present invention with a number of the elements being shown schematically since the general construction of such headers is well known to one skilled in the art. The header 10 includes a header frame 11 having a main frame tube 12 extending across the width of the header between two end frames one of which is shown at 13 and the other of which is of course at the other end and therefore not visible in the elevation of FIG. 1. The main tube 12 is suitably supported and attached on a propulsion vehicle in a manner so that the header frame can be moved forwardly across the ground in cutting a standing crop. The end frame 13 extends forwardly from the main tube 12 to a forward nose section 14. The main tube 12 carries a plurality of frame bars which extend downwardly and forwardly for supporting a table 15 of the header onto which crop material is deposited after cutting. The structural elements defining the frame bars on the table are not shown for convenience of illustration since again these are well known to one skilled in the art and can vary in accordance with engineering considerations.

On the table 15 is provided a crop conveyor 16 which is arranged to transport the crop after cutting across the width of a header to a discharge location. In the embodiment shown the conveyor is provided as a draper canvas 17 mounted on rollers 18. Other embodiments can use alternative crop transportation systems and primarily an auger which is commonly used as an alternative for the draper system. The embodiments of the present invention are not limited to either of the different types of header.

At the front of the table 15 is provided a cutter bar generally indicated at 19 which is again only shown schematically since the construction of this is well known to one skilled in the art. The cutter bar shown provides a sickle knife in guards which reciprocates back and forth in a cutting action on the standing crop so that the crop is deposited on the draper for transportation to the discharge location.

When used on a combine harvester the discharge location is associated with a crop transfer system which transfers the crop rearwardly into the feeder house of the combine. Headers of this type can of course also be used as a swather where the discharge location simply discharges the crop onto the ground in a swath or through a crop conditioner onto the ground.

The header further includes a reel generally indicated at 20. The reel 20 includes mounting arms 21 pivoted on a suitable mounting 22 adjacent the tube 12 so that the arms project forwardly from the frame to a position over the end frame elements 13 so as to provide support for the reel extending the header above the cutter bar. Each arm is movable in its pivotal action by a suitable drive actuator 23.

The reel further includes end support discs, one of which is shown only schematically in FIG. 1 as a circle at the end of the reel but it will be appreciated that the structural arrangement of the disc can vary in accordance with engineering requirements. The end disc is indicated at 24 and is mounted on a shaft 25 which supports the disc for rotation about an axis 26 of the reel.

The disc supports a plurality of reel bats 27 at angularly spaced positions around the axis 26. Each reel bat carries a plurality of longitudinally spaced fingers 28 which project outwardly from the bar for engaging the crop Each reel bat is pivotal about its own individual axis 26A parallel to the axis 26 so as to change the angular position of the fingers around the axis 26A of the bat. The angular position of the bat about its axis is controlled by a linkage 29 of the bat which cooperates with a cam 30 of the reel so that as the bats rotate the linkage moves the bats to the required angular position in dependence upon the co-operation of the linkage with the cam.

Arrangements of this general type are well known and conventional as discussed in the prior art U.S. Pat. No. 6,591,598 (Remillard), the disclosure of which is incorporated herein by reference or may be referenced for further details not shown herein. The following description relates to the modifications and improvements set forth in the present application and refers to the details shown in FIG. 1 and the further drawings.

The reel 20 thus has a plurality of reel bats 27 at spaced positions around the reel axis, the reel bats all lying on a common bat circle 27A around the reel axis 26 so that rotation of the reel causes the reel bats 27 to follow a path of movement lying on the bat circle 27A. Each of the reel bats is driven in pivotal movement by a drive linkage 29 including the cam 30 around its respective bat axis parallel to the reel axis so as to vary the angle of the fingers about the bat axis as the reel rotates. One example of this arrangement is described in detail in the above referenced patent. Also as described, each reel bat has a row of bat fingers 28 projecting generally outwardly from the bat axis with the bat fingers of the row being arranged at longitudinally spaced positions along the bat axis and including a main set of fingers 28A and an end most finger 28B adjacent an end of the reel. An end shield plate 40 is mounted on the reel at the end of the reel for rotation with the bats around the reel axis and lying generally in a radial plane of the axis of the reel. The end shield plate 40 is generally planar in the radial plane and includes an inner edge 41 and an outer peripheral edge 42. The inner edge 41 is generally circular and is suitably located to accommodate components internal thereto. The outer peripheral edge 42 is located generally radially inward of an outer tip 28T of the bat fingers so that the tip and a portion of the finger adjacent the tip is exposed beyond the peripheral edge 42 around the full periphery of the plate and as the fingers rotate back and forth around the bat axis.

Figure 3:
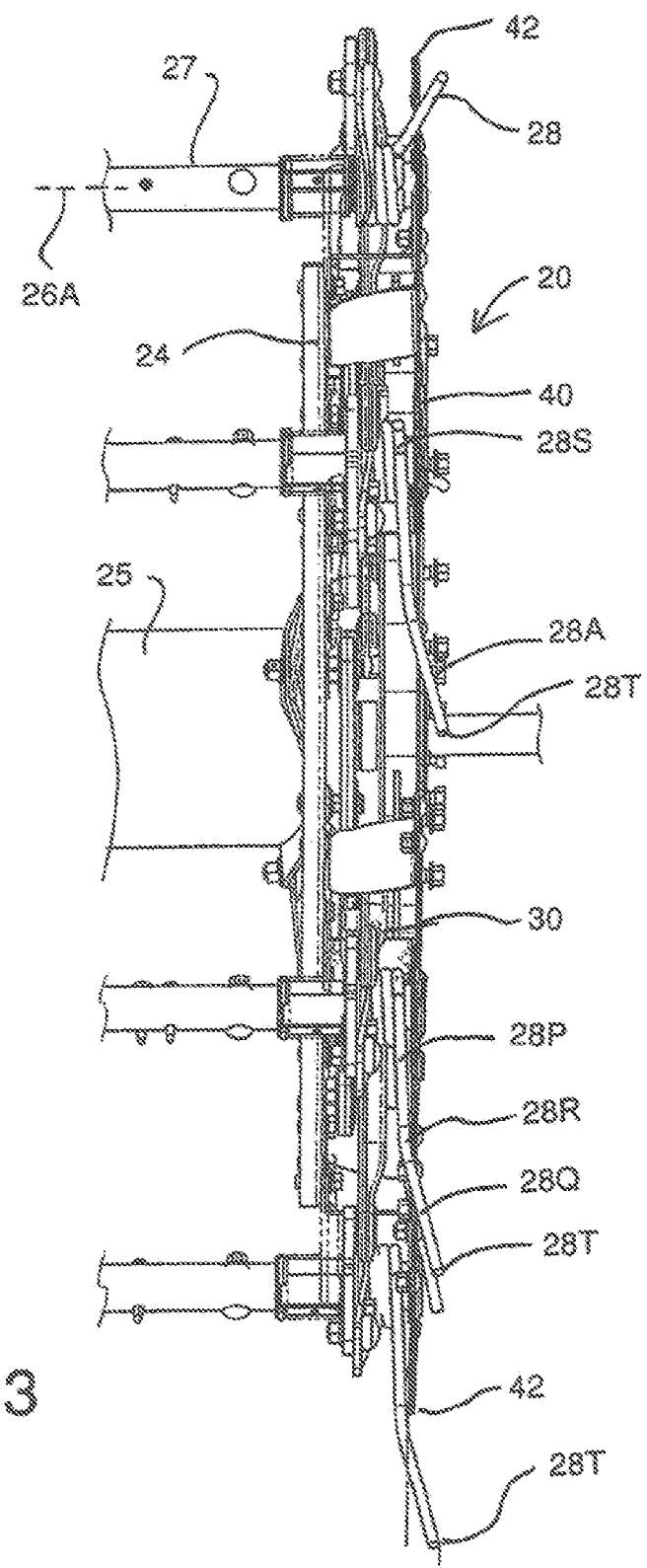
FIG. 3 is a longitudinal cross-sectional view of the reel only of FIG. 1.
Figure 4:
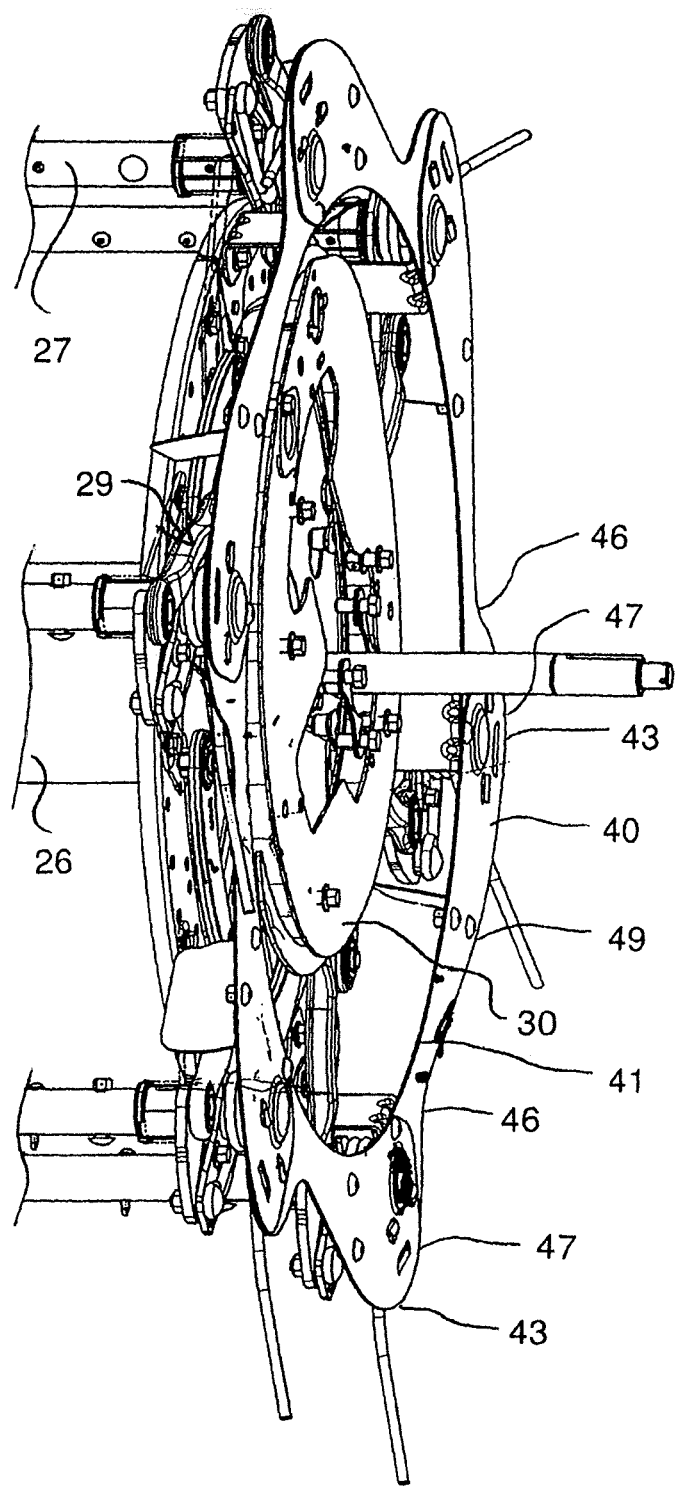
FIG. 4 is an isometric view of the reel only of FIG. 1 showing only the end of the reel including the finger control cam.

As best shown in FIG. 3, of the endmost fingers 28A of the bats 27 have a base 28S at the bat which is connected to the bat 27 at a position axially inside the end shield plate 40. The bat tubes 27 terminate inside the end plate and may just touch the end plate but there is no connection thereto.

Each of the endmost fingers 28A is shaped to define an outer tip 28T which is axially spaced from the base 28S to a position at least axially aligned with the radial plane of the end shield plate 40, and as shown in FIG. 3 is axially spaced from the base 28S on one side of the plate 40 to a position beyond the radial plane of the end shield plate 40.

As shown at 28R, each of the endmost fingers is bent in a direction longitudinally of the reel axis 26A so as to define a first portion 28P extending generally in radial plane and inside the plate 40 and a second portion 28Q beyond the bend 28R and extending to the tip 28T. In order to allow this bend to occur and be maintained, each of the endmost fingers is formed from a metal typically steel rod or wire. All of the fingers can be formed in this manner but typically the other fingers of the bats other than the endmost fingers are formed of plastics material and lie in a radial plane of the bat axis. Fingers of this type are well known.

As shown best in FIG. 5, the peripheral edge 42 of the end shield plate 40 has an apex 43 at each of the bats 27. The apex is smoothly curved around the axis 26A and is radially outwardly of the axis. FIG. 5 also shows an imaginary line 44 which forms one example of a conventional hexagonal shape of an end plate and an imaginary line 45 which forms a circle surrounding the apexes. However in the present arrangement, the peripheral edge at each of the bats includes portions 46 which are recessed from the straight line 44 joining the apexes.

That is the end shield plate 40 has a portion 47 adjacent the apex 43 which is substantially part circular around the bat axis 26A. This allows rotation of the endmost finger 28A and particularly the portion 28Q around the bat axis without contacting the peripheral edge 42. The circular portion 47 terminates on the downstream side of each apes in relation to the direction of movement D in a deepest recess portion 48 which is most recessed from the imaginary circle 45. This is located at the point where the finger 28A moves most rearwardly around the axis 26A. From that deepest position 48, the peripheral edge 42 inclines smoothly and in a curve backwardly and upwardly in a portion 49 to the end point of the portion 47. Thus the peripheral edge of the end shield plate is recessed by a sharper angle in the portion 47 on the downstream side of the apex 43 than on the upstream side in the portion 47 of the apex 43 relative to the direction D of rotation of the reel. That is the peripheral edge is shaped so that a deepest recess 46 of the peripheral edge 42 is closer to an upstream apex 43 than a downstream apex to form a scalloped shape of the peripheral edge. The scalloped shape forms discontinuities in the peripheral edge of the end shield plate which engage the crop and help in causing the crop to move rearwardly with the reel much more than would a smooth circular edge as shown at 45 or even a hexagonal edge as shown at 44.

Thus the peripheral edge 42 of the end shield plate 40 has a portion 47 adjacent the apex which is substantially part circular around the bat axis 26A and remains substantially circular up to a position close to a deepest recess 46 of the peripheral edge.

The end shield plate lies immediately adjacent an end sheet (not shown) of the header lying in a vertical plane at right angles to the cutter bar so as to lie along the direction of working movement and adjacent the end shield plate.

The opposite end is shown in FIG. 7 where there is provided an end shield plate 401 of the same shape as that at the cam control end. In FIG. 7 therefore there is no cam. Another optional feature shown is that both ends can include both the end finger and the next adjacent finger which are formed of metal so that they can be bent toward the end plane. Also the outer face of the end plate carries right angle blades 402 with a flange bolted to the end plate and a blade portion which projects axially from the end plate with the line along the blade extending radially. This blade acts to cooperate with the end sheet of the harvester to reduce the collection of crop material in that area.

The invention claimed is:

1. A crop harvesting header comprising:
    a header frame structure arranged for movement in a direction of working movement across ground carrying a crop to be harvested;
    a cutter bar arranged across a forward edge of the header frame structure for cutting the crop;
    a cut crop transport arrangement mounted on the header frame structure for receiving and transporting the cut crop for further processing;
    and a reel for controlling movement of the crop in the area over the cutter bar; the reel being mounted on the header frame structure for movement therewith in the direction of movement and for rotation about a reel axis generally parallel to the cutter bar;
    the reel having a plurality of reel bats at spaced positions around the reel axis, the reel bats all lying on a common bat circle around the reel axis so that rotation of the reel causes the reel bats to follow a path of movement lying on the bat circle;
    each of the reel bats being pivotal by a drive linkage about its respective bat axis parallel to the reel axis so as to vary the angle of the bats about the bat axis as the reel rotates;
    each reel bat having a row of bat fingers projecting generally outwardly from the bat axis with the bat fingers of the row being arranged at longitudinally spaced positions along the bat axis and including an end most finger adjacent an end of the reel;
    an end shield plate mounted on the reel at the end of the reel for rotation with the bats around the reel axis and lying generally in a radial plane of the axis of the reel;
    the end shield plate having a peripheral edge located radially inward of an outer tip of the bat fingers;
    each of the endmost fingers of the bats having a base at the bat which is axially inside the end shield plate;
    and each of the endmost fingers is shaped to define an outer tip which is axially spaced from the base to a position at least axially aligned with the radial plane of the end shield plate; wherein
    the peripheral edge of the end shield plate has an apex at each of the bats and the peripheral edge at each of the bats includes portions which are recessed from a straight line joining the apexes to allow rotation of the endmost finger around the bat axis without contacting the peripheral edge.

2. The header according to claim 1 wherein each of the endmost fingers is shaped to define an outer tip which is axially spaced from the base to a position beyond the radial plane of the end shield plate.

3. The header according to claim 1 wherein each of the endmost fingers is bent in a direction longitudinally of the axis.

4. The header according to claim 1 wherein each of the endmost fingers is formed from a metal rod or wire.

5. The header according to claim 1 wherein other fingers of the bats other than the endmost fingers are formed of plastics material and lie in a radial plane of the bat axis.

6. The header according to claim 1 wherein the peripheral edge of the end shield plate has a portion adjacent the apex which is substantially part circular around the bat axis.

7. The header according to claim 1 wherein the peripheral edge of the end shield plate is recessed by a sharper angle on the downstream side of the apex than on the upstream side of the apex relative to the direction of rotation of the reel.

8. The header according to claim 1 wherein the peripheral edge is shaped so that a deepest recess of the peripheral edge is closer to an upstream apex than a downstream apex to form a scalloped shape.

9. The header according to claim 8 wherein the scalloped shape forms discontinuities in the peripheral edge of the end shield plate which help in causing the crop to move rearwardly with the reel.

10. The header according to claim 1 wherein the peripheral edge of the end shield plate has a portion adjacent the apex which is substantially part circular around the bat axis and remains substantially circular up to a position close to a deepest recess of the peripheral edge.

11. The header according to claim 1 wherein the drive linkage comprises a cam member mounted at one end of the reel, each bat having associated therewith a respective control link, such that, as the reel rotates through a series of angularly spaced positions of the bats, the movement of the control link defined by the cam member causes said pivotal movement of the respective bat about the bat axis, and wherein the endmost finger has a base thereof which is located between the cam member and the end shield plate.

12. The header according to claim 1 wherein there is provided an end sheet lying in a vertical plane at right angles to the cutter bar so as to lie along the direction of working movement and adjacent the end shield plate.

13. A crop harvesting header comprising:
    a header frame structure arranged for movement in a direction of working movement across ground carrying a crop to be harvested;
    a cutter bar arranged across a forward edge of the header frame structure for cutting the crop;
    a cut crop transport arrangement mounted on the header frame structure for receiving and transporting the cut crop for further processing;
    and a reel for controlling movement of the crop in the area over the cutter bar; the reel being mounted on the header frame structure for movement therewith in the direction of movement and for rotation about a reel axis generally parallel to the cutter bar;
    the reel having a plurality of reel bats at spaced positions around the reel axis, the reel bats all lying on a common bat circle around the reel axis so that rotation of the reel causes the reel bats to follow a path of movement lying on the bat circle;

each of the reel bats being pivotal by a drive linkage about its respective bat axis parallel to the reel axis so as to vary the angle of the fingers about the bat axis as the reel rotates;

each reel bat having a row of bat fingers projecting generally outwardly from the bat axis with the bat fingers of the row being arranged at longitudinally spaced positions along the bat axis;

an end shield plate mounted on the reel at the end of the reel for rotation with the bats around the reel axis and lying generally in a radial plane of the axis of the reel;

the end shield plate having a peripheral edge located radially inward of an outer tip of the bat fingers;

wherein the peripheral edge of the end shield plate has an apex at each of the bats and the peripheral edge at each of the bats includes portions which are recessed from a straight line joining the apexes.

14. The header according to claim 13 wherein the peripheral edge of the end shield plate has a portion adjacent the apex which is substantially part circular around the bat axis.

15. The header according to claim 13 wherein the peripheral edge of the end shield plate is recessed by a sharper angle on the downstream side of the apex than on the upstream side of the apex relative to the direction of rotation of the reel.

16. The header according to claim 13 wherein the peripheral edge is shaped so that a deepest recess of the peripheral edge is closer to an upstream apex than a downstream apex to form a scalloped shape.

17. The header according to claim 16 wherein the scalloped shape forms discontinuities in the peripheral edge of the end shield plate which help in causing the crop to move rearwardly with the reel.

18. The header according to claim 13 wherein the peripheral edge of the end shield plate has a portion adjacent the apex which is substantially part circular around the bat axis and remains substantially circular up to a position close to a deepest recess of the peripheral edge.

19. The header according to claim 13 wherein there is provided an end sheet lying in a vertical plane at right angles to the cutter bar so as to lie along the direction of working movement and adjacent the end shield plate.

* * * * *